(12) United States Patent
Nihey et al.

(10) Patent No.: US 11,857,926 B2
(45) Date of Patent: Jan. 2, 2024

(54) NANOCARBON SEPARATION APPARATUS AND NANOCARBON SEPARATION METHOD

(71) Applicant: NEC CORPORATION, Tokyo (JP)

(72) Inventors: Fumiyuki Nihey, Tokyo (JP); Yuki Kuwahara, Tsukuba (JP); Takeshi Saito, Tsukuba (JP); Fusako Sasaki, Tsukuba (JP)

(73) Assignee: NEC CORPORATION, Tokyo (JP)

( * ) Notice: Subject to any disclaimer, the term of this patent is extended or adjusted under 35 U.S.C. 154(b) by 695 days.

(21) Appl. No.: 16/488,800

(22) PCT Filed: Feb. 28, 2017

(86) PCT No.: PCT/JP2017/007830
§ 371 (c)(1),
(2) Date: Aug. 26, 2019

(87) PCT Pub. No.: WO2018/158830
PCT Pub. Date: Sep. 7, 2018

(65) Prior Publication Data
US 2020/0061540 A1    Feb. 27, 2020

(51) Int. Cl.
*B32B 9/00*       (2006.01)
*B01D 57/02*   (2006.01)
(Continued)

(52) U.S. Cl.
CPC ............... *B01D 57/02* (2013.01); *B03C 5/00* (2013.01); *B82Y 40/00* (2013.01); *C01B 32/159* (2017.08);
(Continued)

(58) Field of Classification Search
CPC .... Y10T 428/30; B82Y 30/00; Y10S 977/742
(Continued)

(56) References Cited

U.S. PATENT DOCUMENTS 3,870,617 A  *  3/1975  Bourat .................. B01D 63/082
                                                                        204/633
2003/0052008 A1*  3/2003  Liu ................... G01N 27/44708
                                                                        204/459
(Continued)

FOREIGN PATENT DOCUMENTS

JP       2005-527455 A      9/2005
JP       2008-055375 A      3/2008
(Continued)

OTHER PUBLICATIONS

International Search Report for PCT/JP2017/007830 dated Apr. 11, 2017 [PCT/ISA/210].

*Primary Examiner* — Daniel H Miller
(74) *Attorney, Agent, or Firm* — Sughrue Mion, PLLC

(57) ABSTRACT

A nanocarbon separation apparatus includes: an electrophoresis tank; electrodes disposed in an upper part and a lower part of the electrophoresis tank; a first injection port through which a liquid is injected into the electrophoresis tank; a second injection port which is provided below the first injection port and through which a liquid having a pH lower than a pH of the liquid injected through the first injection port is injected into the electrophoresis tank; and a recovery port provided in a surface facing a surface having the first injection port and the second injection port, wherein the liquid injected through at least one of the first injection port and the second injection port is a dispersion liquid having nanocarbons dispersed therein.

12 Claims, 5 Drawing Sheets

(51) Int. Cl.
*C01B 32/159* (2017.01)
*C01B 32/172* (2017.01)
*B03C 5/00* (2006.01)
*B82Y 40/00* (2011.01)
*B82Y 30/00* (2011.01)

(52) U.S. Cl.
CPC ............ *C01B 32/172* (2017.08); *B82Y 30/00* (2013.01); *C01B 2202/02* (2013.01); *Y10T 428/30* (2015.01)

(58) Field of Classification Search
USPC .......................................... 428/408; 423/448
See application file for complete search history.

(56) References Cited

U.S. PATENT DOCUMENTS

2010/0189626 A1* 7/2010 Tanaka ................ H01L 51/0048
423/439
2012/0103809 A1 5/2012 Ihara et al.

FOREIGN PATENT DOCUMENTS

| | | |
|---|---|---|
| JP | 2008-266112 A | 11/2008 |
| JP | 2008-285386 A | 11/2008 |
| WO | 2006/013788 A1 | 2/2006 |
| WO | 2008/143281 A1 | 11/2008 |
| WO | 2010/150808 A1 | 12/2010 |
| WO | 2011/102322 A1 | 8/2011 |

* cited by examiner

NANOCARBON SEPARATION APPARATUS AND NANOCARBON SEPARATION METHOD

CROSS REFERENCE TO RELATED APPLICATIONS

This application is a National Stage of International Application No. PCT/JP2017/007830, filed on Feb. 28, 2017.

TECHNICAL FIELD

The present invention relates to a nanocarbon separation apparatus and a nanocarbon separation method.

BACKGROUND ART

In recent years, it has been expected that carbon materials having a size in a nanometer range (hereinafter referred to as "nanocarbons") will be applied to various fields due to their mechanical properties, electrical properties, chemical properties, and the like.

In the case of nanocarbons, nanocarbons having different properties are simultaneously produced in a manufacturing stage in some cases. When nanocarbons having different electrical properties are used in an electronic material when mixed together, a problem such as the deterioration in the characteristics thereof is likely to be caused. Thus, it is necessary to separate nanocarbons having different properties.

In order to separate nanocarbons, Patent Document 1 describes a nanocarbon material separation method which includes: a step of introducing a dispersion solution including nanocarbon materials dispersed in nanocarbon micelle groups having a plurality of different charges and a holding solution having a specific gravity different from that of the nanocarbon materials into an electrophoresis tank by laminating the solutions by disposing them in a predetermined direction; and a step of separating the nanocarbon micelle groups into two or more nanocarbon micelle groups by applying electricity in a serial direction to the introduced, arranged, and laminated dispersion solution and holding solution.

PRIOR ART DOCUMENTS

Patent Documents

[Patent Document 1] PCT International Publication No. WO2010/105808

SUMMARY OF THE INVENTION

Problem to be Solved by the Invention

However, the separation method described in Patent Document 1 has a problem in the efficiency of separation. That is to say, in the separation method described in Patent Document 1, some time is taken to perform the separation.

An object of the present invention is to provide a nanocarbon separation apparatus and a nanocarbon separation method in which the separation efficiency can be improved, the time required for separation can be shortened, and mass production can be achieved when nanocarbons having different properties are separated.

Means for Solving the Problem

A nanocarbon separation apparatus of the present invention includes: an electrophoresis tank; electrodes disposed in an upper part and a lower part of the electrophoresis tank; a first injection port through which a liquid is injected into the electrophoresis tank; a second injection port which is provided below the first injection port and through which a liquid having a pH lower than a pH of the liquid injected through the first injection port is injected into the electrophoresis tank; and a recovery port provided in a surface facing a surface having the first injection port and the second injection port, wherein the liquid injected through at least one of the first injection port and the second injection port is a dispersion liquid having nanocarbons dispersed therein.

A nanocarbon separation apparatus of the present invention includes: an electrophoresis tank; electrodes disposed in an upper part and a lower part of the electrophoresis tank; a first injection port through which a liquid is injected into the electrophoresis tank; a second injection port which is provided below the first injection port and through which a liquid having a pH lower than a pH of the liquid injected through the first injection port is injected into the electrophoresis tank; a first recovery port provided at a position in which the first recovery port faces the first injection port; and a second recovery port provided at a position in which the second recovery port faces the second injection port, wherein at least one of the liquids injected through the first injection port and the second injection port is a dispersion liquid having nanocarbons dispersed therein.

A nanocarbon separation method of the present invention includes: applying a direct current to electrodes disposed in an upper part and a lower part of an electrophoresis tank; injecting a dispersion liquid into the electrophoresis tank through a first injection port provided in one side surface of the electrophoresis tank; injecting a liquid having a pH lower than a pH of the dispersion liquid through a second injection port provided below the first injection port of the one side surface to the electrophoresis tank; and recovering liquids through a first recovery port provided at a position in which the first recovery port faces the first injection port and a second recovery port provided at a position in which the second recovery port faces the second injection port, wherein at least one of the liquids injected through the first injection port and the second injection port is a dispersion liquid having nanocarbons dispersed therein.

Effect of the Invention

According to the present invention, it is possible to provide a nanocarbon separation apparatus and a nanocarbon separation method capable of improving the separation efficiency or shortening a time required for separation and achieving mass production when nanocarbons having different properties are separated.

EMBODIMENTS FOR CARRYING OUT THE INVENTION

Figure 1A:
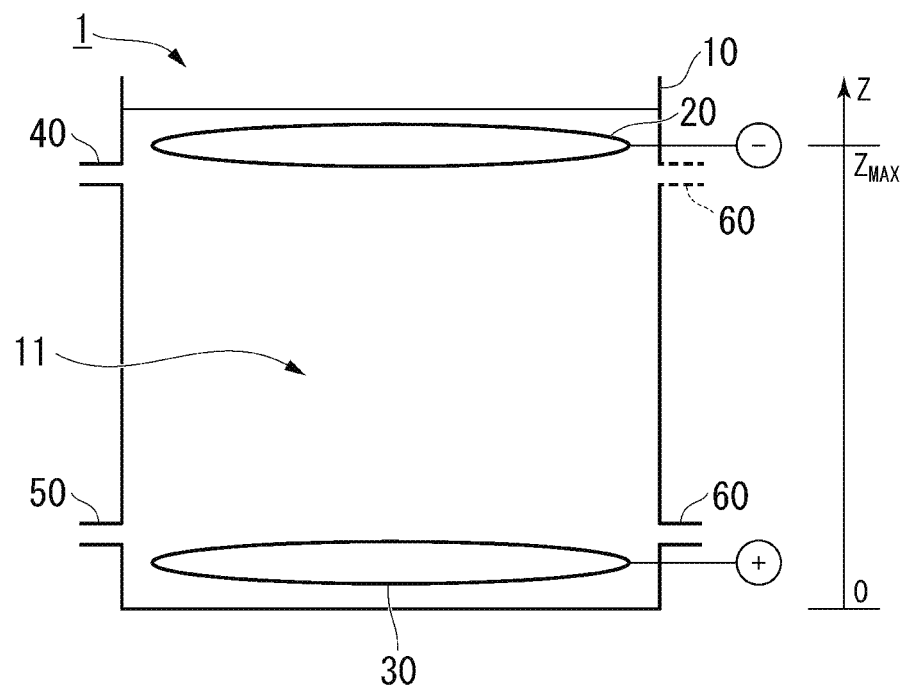
FIG. 1A is a schematic diagram showing an example of a separation apparatus according to an embodiment.

A nanocarbon separation method, a nanocarbon purification method, and a dispersion liquid according to an embodiment will be described below with reference to the drawings. In the embodiment, nanocarbon materials refer to carbon materials mainly composed of carbon including single-walled carbon nanotubes, double-walled carbon nanotubes, multi-walled carbon nanotubes, carbon nanohorns, carbon nanotwists, graphenes, fullerenes, and the like. As an example regarding nanocarbons, the case of separating single-walled carbon nanotubes of a semiconducting type and single-walled carbon nanotubes of a metallic type from a dispersion liquid containing single-walled carbon nanotubes will be described in detail.

(1) Single-walled carbon nanotubes It is known that single-walled carbon nanotubes can be divided into two different types, i.e., those having metallic properties and those having semiconducting properties in accordance with a diameter and a winding manner of tubes. When single-walled carbon nanotubes are synthesized using currently known manufacturing methods, mixed materials including single-walled carbon nanotubes which include single-walled carbon nanotubes having metallic properties (hereinafter referred to as "metallic single-walled carbon nanotubes") and single-walled carbon nanotubes having semiconducting properties (hereinafter referred to as "semiconducting single-walled carbon nanotubes") in a statistical ratio of 1:2 are obtained.

It should be noted that, in the following description, single-walled carbon nanotubes in which metallic single-walled carbon nanotubes and semiconducting single-walled carbon nanotubes are mixed together are referred to as a single-walled carbon nanotube mixture. The single-walled carbon nanotube mixture is not particularly limited as long as the single-walled carbon nanotube mixture contains metallic single-walled carbon nanotubes and semiconducting single-walled carbon nanotubes. Furthermore, single-walled carbon nanotubes in the embodiment may be independently single-walled carbon nanotubes or may be single-walled carbon nanotubes in which some of carbon atoms are substituted with arbitrary functional groups, or single-walled carbon nanotubes in which some of carbon atoms are modified by arbitrary functional groups.

An example in which a dispersion liquid in which a single-walled carbon nanotube mixture is dispersed in a dispersion medium is separated into single-walled carbon nanotubes of a semiconducting type and single-walled carbon nanotubes of a metallic type will be described in detail below.

(2) Dispersion liquid of single-walled carbon nanotube mixture A dispersion liquid of a single-walled carbon nanotube mixture in the embodiment is a liquid in which a single-walled carbon nanotube mixture is dispersed in a dispersion medium. It is desirable to use water or heavy water as the dispersion medium for the dispersion liquid. However, a dispersion medium such as an organic solvent and an ionic liquid may be used as long as the dispersion medium is a dispersion medium which can disperse single-walled carbon nanotubes. As an auxiliary material used for dispersing a single-walled carbon nanotube mixture in a dispersion medium, a non-ionic surfactant, a cationic surfactant, an anionic surfactant, another dispersion auxiliary agent, and the like may be used. Particularly, it is desirable to use a non-ionic surfactant. The non-ionic surfactant will be described later. A method of preparing the dispersion liquid will also be described later.

A separation apparatus used in the embodiment will be described below.

Figure 1B:
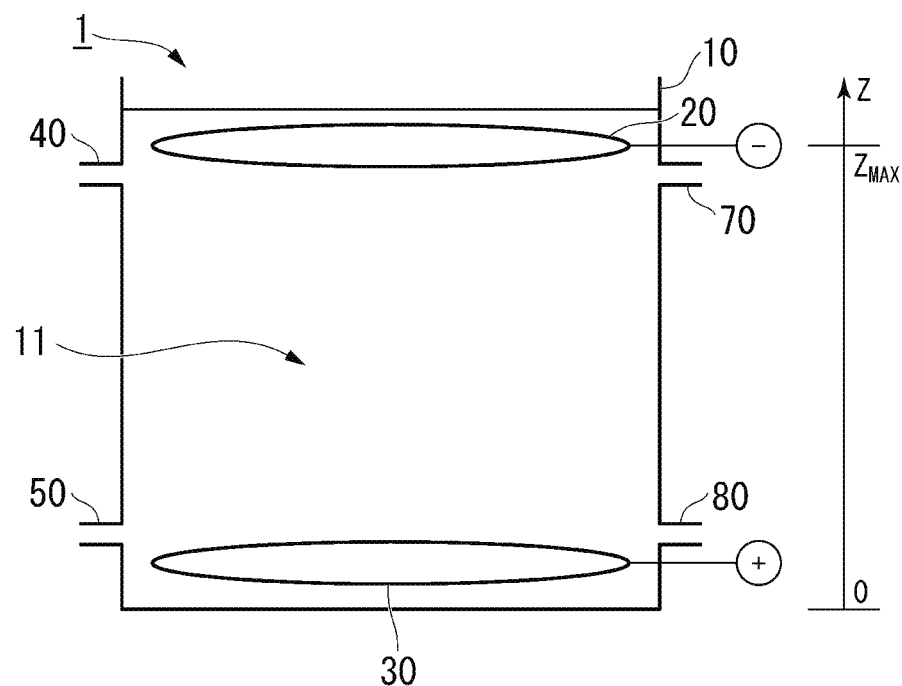
FIG. 1B is a schematic diagram showing another example of the separation apparatus according to the embodiment.

FIGS. 1A and 1B both show separation apparatuses in the embodiment.

A separation apparatus 1 in FIG. 1A includes an electrophoresis tank 10, an electrode 20 disposed in an upper part in the electrophoresis tank 10, an electrode 30 disposed in a lower part in the electrophoresis tank 10, a first injection port 40 through which a liquid is injected into the electrophoresis tank 10, a second injection port 50 which is provided below the first injection port 40 and through which a liquid having a pH lower than that of the liquid injected through the first injection port 40 is injected into the electrophoresis tank 10, and a recovery port 60 provided in a surface facing a surface having the first injection port 40 and the second injection port 50. The liquid injected through at least one of the first injection port 40 and the second injection port 50 is a dispersion liquid having nanocarbons dispersed therein.

A separation apparatus 1 in FIG. 1B includes an electrophoresis tank 10, an electrode 20 disposed in an upper part in the electrophoresis tank 10, an electrode 30 disposed in a lower part in the electrophoresis tank 10, a first injection port 40 through which a liquid is injected into the electrophoresis tank 10, a second injection port 50 which is provided below the first injection port 40 and through which a liquid having a pH lower than that of a liquid injected through the first injection port 40 is injected into the electrophoresis tank 10, a first recovery port 70 provided at a position in which the first recovery port 70 faces the first injection port 40, and a second recovery port 80 provided at a position in which the second recovery port 80 faces the second injection port 50. At least one of the liquids injected through the first injection port 40 and the second injection port 50 is a dispersion liquid having nanocarbons dispersed therein.

The electrophoresis tank 10 has a space having a liquid accommodated therein. A dispersion liquid of a single-walled carbon nanotube mixture to be separated is injected into the electrophoresis tank 10 and a carbon nanotube mixture is separated. Any material may be adopted for the electrophoresis tank 10 as long as the material is an insulating material. For example, glass, quartz, acrylic resin, and the like can be used as the material of the electrophoresis tank 10.

When a voltage is applied to the electrode 20 and the electrode 30, the single-walled carbon nanotube mixture is separated into metallic single-walled carbon nanotubes and semiconducting carbon nanotubes. The metallic single-walled carbon nanotubes collect near a negative electrode. On the other hand, the semiconducting single-walled carbon nanotubes collect near a positive electrode. For this reason, it is desirable to dispose the electrode 20 and the electrode 30 at an upper end portion and a lower end portion of the electrophoresis tank 10. It is more desirable to dispose a positive electrode in a lower part of the electrophoresis tank 10 and to dispose a negative electrode in an upper part of the electrophoresis tank 10. When the electrode 30 is used as the positive electrode and the electrode 20 is used as the negative electrode, an electric field Z is directed upward from the bottom of the electrophoresis tank 10. On the other hand, when the electrode 30 disposed in the lower part of the electrophoresis tank 10 is used as the negative electrode and the electrode 20 disposed in the upper part of the electrophoresis tank 10 is used as the positive electrode, the electric field Z is directed downward from the top of the electrophoresis tank 10.

Here, in the case of the upward direction and the downward direction, a direction upward in a direction of gravitational force indicates the upward direction and a direction downward in the direction of gravitational force indicates the downward direction when a separation apparatus 1 is installed in a usable state. Platinum or the like can be used as a material of the electrodes 20 and 30.

An injection port 40 is an opening through which a liquid is injected into the electrophoresis tank 10. The injection port 40 in the embodiment is an opening provided in an upper end of the electrophoresis tank 10.

A recovery port 50 is an opening through which a liquid is recovered from the electrophoresis tank 10. The recovery port 50 may be provided at a lower end of the electrophoresis tank 10. When a plurality of recovery ports 50 are provided, it is desirable to provide the recovery ports near the electrodes 20 and 30. Since the separated metallic single-walled carbon nanotubes move to the vicinity of the negative electrode and the semiconducting single-walled carbon nanotubes move to the vicinity of the positive electrode, the moved single-walled carbon nanotubes can be efficiently recovered.

Although a constitution in which the injection port 40 and the recovery ports 50 are provided has been shown in the example shown in FIG. 1, the constitution of the separation apparatus 1 is not limited thereto.

Figure 3:
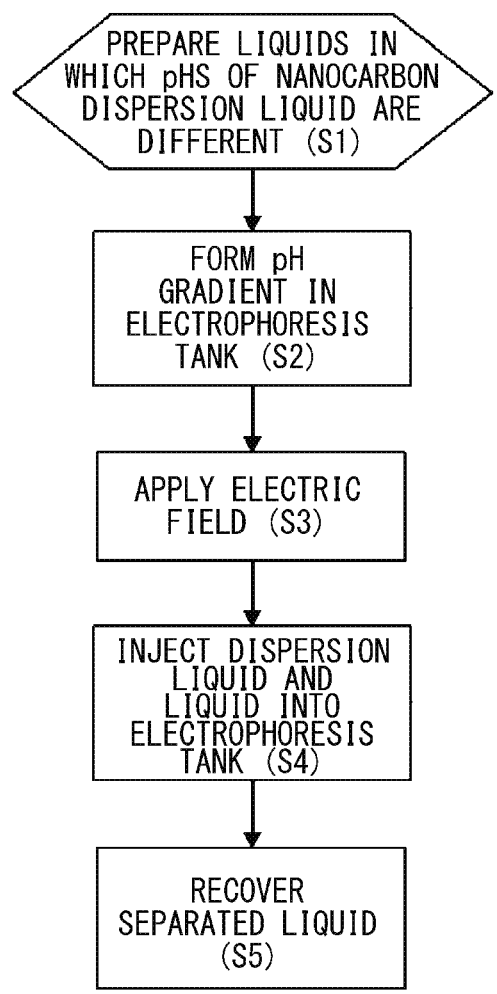
FIG. 3 is a flowchart showing a separation method according to the embodiment.

The separation method according to the embodiment will be described below. FIG. 3 is a flowchart showing the separation method in the embodiment.

First, in a first step (S1), a plurality of liquids having different pHs are prepared. At least one of the plurality of liquids is a dispersion liquid of a single-walled carbon nanotube mixture. The plurality of liquids having different pHs are liquids in which a predetermined solute is contained in a predetermined solvent. As the predetermined solute, for example, a surfactant can be used. Furthermore, as the predetermined solvent, water and heavy water can be used. By adjusting the concentration of a surfactant that is a solute, a pH can be adjusted. For example, heavy water can be used as a solvent and polyoxyethylene (100) stearyl ether (Brij 700 [trade name]) that is a surfactant which is a non-ionic surfactant can be used as a solute. In this case, a 1 wt % aqueous solution of Brij 700 at room temperature (25° C.) has a pH lower than that of a 0.5 wt % aqueous solution of Brij 700.

Next, a method of acquiring a dispersion liquid of a single-walled carbon nanotube mixture is not particularly limited and known methods can be applied as the method. For example, when a single-walled carbon nanotube mixture and a dispersion medium are mixed and subjected to ultrasonic treatment, the single-walled carbon nanotube mixture is dispersed in the dispersion medium. Alternatively, single-walled carbon nanotubes may be dispersed in the dispersion medium using a mechanical shear force. The dispersion liquid may contain a dispersion auxiliary agent such as a surfactant in addition to the single-walled carbon nanotube mixture and the dispersion medium.

Subsequently, in a second step (S2), the liquids prepared in the first step are injected into the electrophoresis tank 10 so that the pHs of the liquids increase from the bottom to the top thereof in a direction of gravitational force irrespective of whether or not the liquids contain single-walled carbon nanotubes. To be specific, a liquid having a lowest pH among the prepared liquids is put into the electrophoresis tank 10. Subsequently, a liquid having a second higher pH among the prepared liquids is put into the electrophoresis tank 10. After that, the other liquids are put into the electrophoresis tank 10 in order from a liquid having a lowest pH. This makes it possible to form a pH gradient in which the pHs of the liquids increase from the bottom to the top thereof in the direction of gravitational force in the electrophoresis tank.

In a third step (S3), a direct current (DC) voltage is applied to the electrophoresis tank. Metallic single-walled carbon nanotubes in the carbon nanotube mixture dispersed in the liquid move to the vicinity of the negative electrode and semiconducting single-walled carbon nanotubes move toward the positive electrode side. As a result, the carbon nanotube mixture dispersed in each of the liquids can be separated into a metallic type and a semiconducting type. In the case of using a liquid having a non-ionic surfactant dissolved therein, metallic single-walled carbon nanotubes have a positive charge in the liquid and semiconducting single-walled carbon nanotubes have a very weak negative charge. Furthermore, after voltage application, the semiconducting single-walled carbon nanotubes tend to have a pH higher than that of the metallic single-walled carbon nanotubes. The single-walled carbon nanotube mixture is separated into a metallic type and a semiconducting type due to a combined force of a moving force generated due to a difference between the pHs and an electrophoretic force generated due to an electric field and charges.

In the case of a voltage to be applied, an optimal value thereof needs to be determined using a composition of the dispersion medium and an amount of charge of the single-walled carbon nanotube mixture. When water, heavy water, or the like is used as the dispersion medium, an application voltage applied between electrodes which are farthest away from each other can be an arbitrary value between greater than 0 V and 1000 V or less 0 to 1000 V). Particularly, since water and heavy water minimize the effects of electrolysis, it is desirable to apply a voltage in a range of greater than 0 V and 120 V or less (0 to 120 V).

In a fourth step (S4), the dispersion liquid is injected into the electrophoresis tank through a first injection port provided in one side surface of the electrophoresis tank and a liquid having a pH lower than that of the dispersion liquid is injected into the electrophoresis tank through a second injection port provided below the first injection port. Injection is continuously performed while the separation process is being performed.

Finally, in a fifth step (S5), the separated liquids are recovered. A separated liquid is recovered through the recovery port 50 in a state in which a voltage is applied. When the separation proceeds, a metallic carbon nanotube layer having metallic carbon nanotubes accumulated therein is generated in the upper part of the electrophoresis tank 10 at which the electrode 20 (the negative electrode) is provided. Furthermore, a semiconducting single-walled carbon nanotube layer having semiconducting single-walled carbon nanotubes accumulated therein is generated in the lower part of the electrophoresis tank 10 at which the electrode 30 (the positive electrode) is provided. Thus, a separated liquid containing metallic carbon nanotubes is recovered through the first recovery port 70 and a separated liquid containing semiconducting single-walled carbon nanotubes is recovered through the second recovery port 80.

A rate at which the dispersion liquid is injected through the first injection port 40, a rate at which a liquid having a pH lower than that of the dispersion liquid is injected through the second injection port 50, and a rate at which the separated liquids are recovered through the first recovery port 70 and the second recovery port 80 are controlled so that the rates are the same. Thus, the separated liquid containing metallic single-walled nanocarbon tubes can be continuously recovered through the first recovery port 70, and at the same time, the separated liquid containing semiconducting single-walled nanocarbon tubes can be continuously recovered through the second recovery port 80 while the dispersion liquid is being injected into the electrophoresis tank 10 through the first injection port 40, and simultaneously, a liquid having a pH lower than that of the dispersion liquid is being injected through the second injection port 50.

Figure 2:
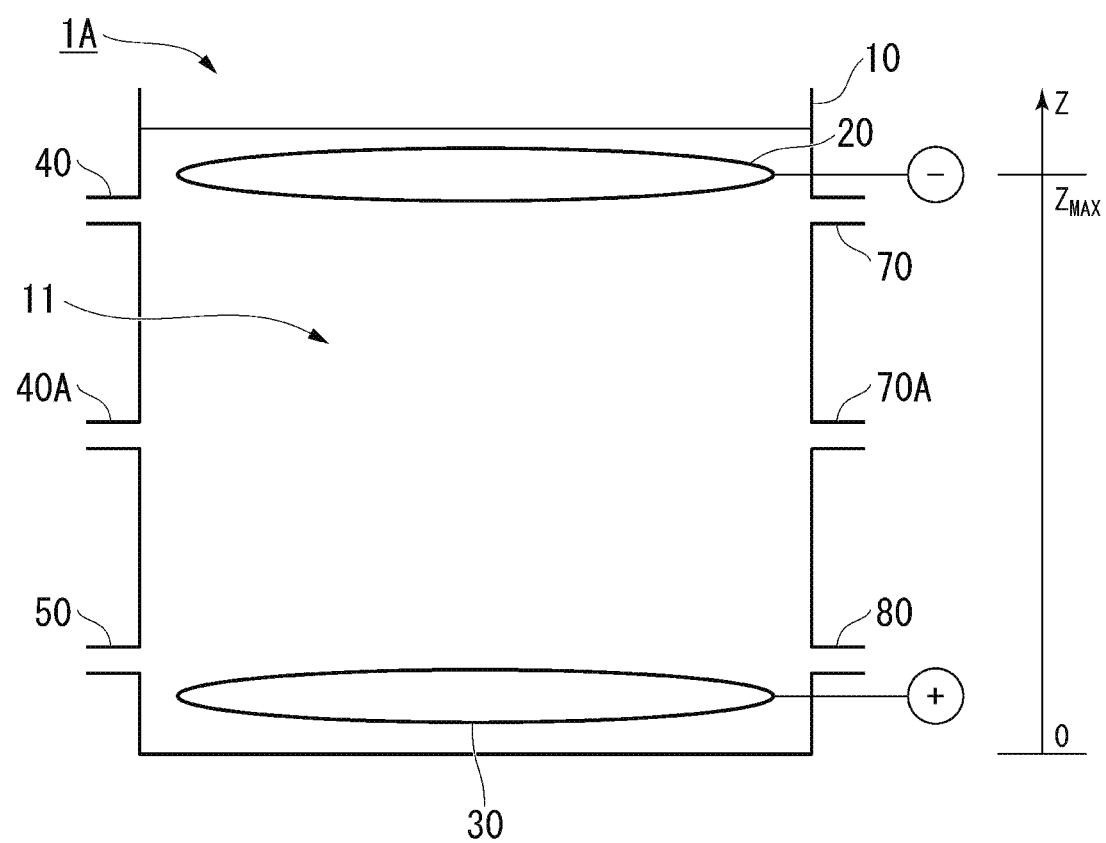
FIG. 2 is a schematic diagram of a separation apparatus of a modified example according to the embodiment.

Although the flowchart of the separation method has been described above on the basis of the separation apparatus shown in FIG. 1B, a separation apparatus 1A of FIG. 2 may be used instead of the separation apparatus 1 of FIG. 1B.

The separation apparatus 1A of FIG. 2 and the separation apparatus 1 of FIG. 1B differ in that the separation apparatus 1A includes a third injection port 40A between a first injection port 40 and a second injection port 50 and a third recovery port 70A between a first recovery port 70 provided at a position in which the first recovery port 70 faces the first injection port 40 and a second recovery port 80 provided at a position in which the second recovery port 80 faces the second injection port 50.

When a separation operation is performed using the separation apparatus 1A, a liquid adjusted to be weakly alkaline or neutral is injected through the first injection port 40, a liquid adjusted to be weakly acidic is injected through the second injection port 50, and a dispersion liquid in which a single-walled carbon nanotube mixture is dispersed in a dispersion medium is injected through the third injection port 40A. The separated liquids are independently recovered through the first recovery port 70, the second recovery port 80, and the third recovery port 70A.

Thus, the single-walled carbon nanotube mixture can be separated into metallic single-walled carbon nanotubes and semiconducting single-walled carbon nanotubes. It should be noted that the first to fifth steps may be repeatedly performed using the recovered liquid obtained in the fifth step. By repeatedly performing the first to fifth steps, the purity of the metallic single-walled carbon nanotubes and the semiconducting single-walled carbon nanotubes can be improved.

It should be noted that, although an example in which the single-walled carbon nanotube mixture is separated into the metallic single-walled carbon nanotubes and the semiconducting single-walled carbon nanotubes has been described in the foregoing description, the present invention is not limited thereto. For example, this may be performed as a purification method of single-walled carbon nanotubes in which only single-walled carbon nanotubes having desired properties are recovered after separation is performed in the electrophoresis tank 10.

The separation efficiency of the recovered sample can be evaluated using a method such as a microscopic Raman spectroscopic analysis (a change in Raman spectrum in a radial breathing mode (RBM) region and a change in Raman spectrum shape in a BWF region), ultraviolet visible near-infrared absorption spectrophotometry (a change in peak shape of an absorption spectrum), and the like. Furthermore, it is also possible to evaluate the separation efficiency by evaluating the electrical properties of the single-walled carbon nanotubes. For example, it is possible to evaluate a sample by preparing a field effect transistor and measuring the transistor characteristics thereof.

In the above description, an example of using polyoxyethylene (100) stearyl ether (Brij 700 [trade name]) as a non-ionic surfactant has been described. However, the non-ionic surfactant is not limited thereto.

As a non-ionic surfactant, it is possible to use one non-ionic surfactant including a non-ionizing hydrophilic site and a hydrophobic site such as an alkyl chain or a combination of a plurality of non-ionic surfactants. For example, a non-ionic surfactant having a polyethylene glycol structure represented by a polyoxyethylene alkyl ether type, an alkyl glucoside type non-ionic surfactant, and the like can be used. Furthermore, it is desirable to use non-ionic surfactants defined by polyoxyethylene (n) alkyl ether (n is 20 or more and 100 or less and in which an alkyl chain length is C12 or more and C18 or less). For example, polyoxyethylene (23) lauryl ether (Brij 35 [trade name]), polyoxyethylene (20) cetyl ether (Brij 58 [trade name]), polyoxyethylene (20) stearyl ether (Brij 78 [trade name]), polyoxyethylene (10) oleyl ether (Brij 97 [trade name]), polyoxyethylene (10) cetyl ether (Brij 56 [trade name]), polyoxyethylene (10) stearyl ether (Brij 76 [trade name]), polyoxyethylene (20) oleyl ether (Brij 98 [trade name]), polyoxyethylene (100) stearyl ether (Brij 700 [trade name]), and the like can be used.

Although an embodiment applicable to separation of metallic type and semiconducting type single-walled carbon nanotubes has been described above, the present invention can also be applied to other nonocarbons, that is, multi-walled carbon nanotubes, double-walled carbon nanotubes, graphene, and the like.

By using the separation method according to the embodiment, the separation efficiency can be improved or the time required for separation can be shortened and mass production can be achieved when nanocarbons having different properties are separated.

Embodiments will be shown below. The following embodiments are examples and the present invention is not limited to the following embodiments.

Embodiment 1

Figure 4:
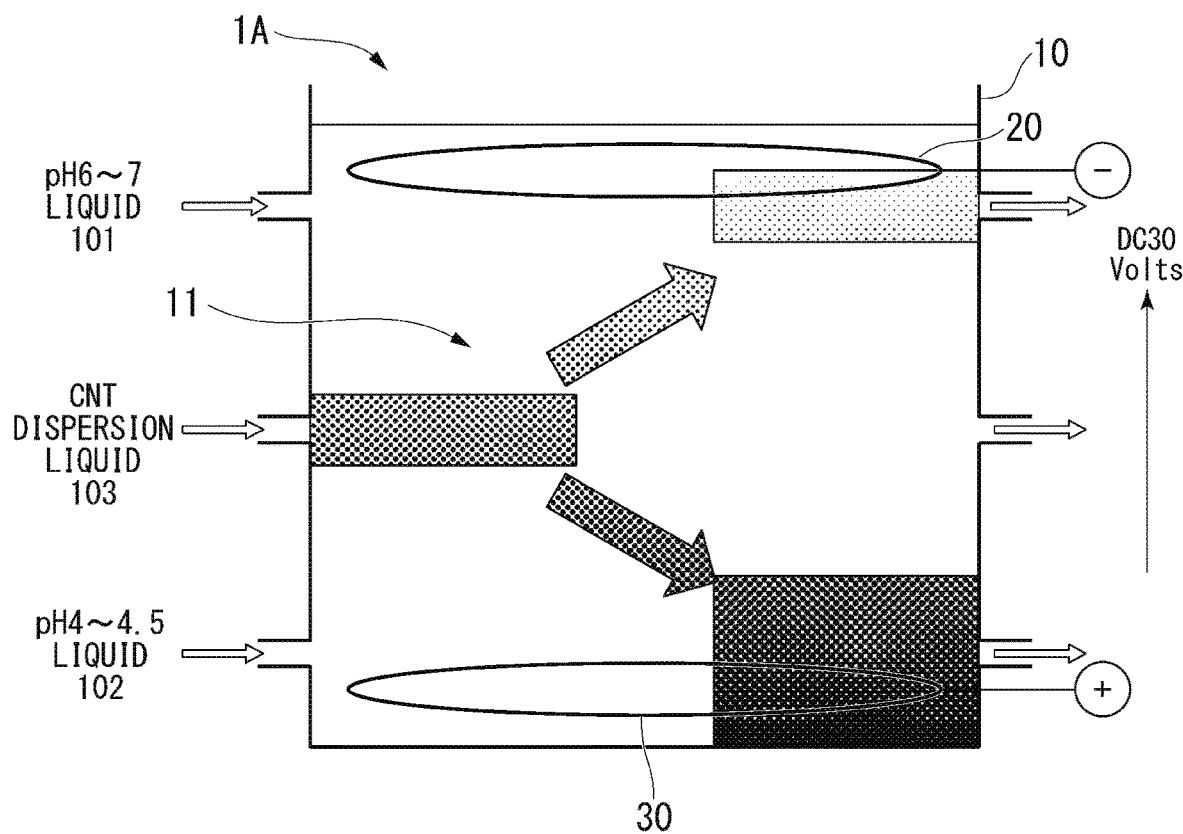
FIG. 4 is a schematic diagram showing electrophoresis conditions according to the embodiment.

FIG. 4 is a schematic diagram showing an example of electrophoresis conditions shown in the embodiments. Description will be provided below with reference to FIG. 4.

(1) Preparation of Liquid for Separation

As a dispersion medium, an aqueous solution in which 0.25 wt % of Brij 700 that was a non-ionic surfactant was dissolved in water was prepared. A single-walled carbon nanotube mixture (eDIPS single-walled carbon nanotube) was mono-dispersed in this dispersion medium. The mono-dispersed liquid was subjected to ultrasonic dispersion treatment using a horn type ultrasonic crusher (output: about 300 W; over 30 minutes). After that, the mono-dispersed liquid was subjected to a ultracentrifugation operation and a supernatant that was 50% of the mono-dispersed liquid was obtained as a dispersion liquid (hereinafter referred to as a "CNT dispersion liquid").

Also, an aqueous solution in which 1 wt % of Brij 700 that was a non-ionic surfactant is dissolved in water (hereinafter referred to as a "1 wt % Brij aqueous solution") and an aqueous solution in which 0.25 wt % of Brij 700 that was a non-ionic surfactant was dissolved in water (hereinafter referred to as a "25 wt % Brij aqueous solution") were prepared.

In the case of the pHs of the liquids, that of the 1 wt % Brij aqueous solution was the lowest (pH 4 to 4.5) and that of the 0.25 wt % Brij aqueous solution was pH 6 to 7.

(2) Injection of Liquid

The prepared liquids were injected into the electrophoresis tank 10 of the separation apparatus 1A shown in FIG. 2.

First, the 1 wt % Brij aqueous solution (pH 4 to 4.5) is put into the electrophoresis tank 10 through the second injection port 50. Thus, a 1 wt % Brij layer was formed using the put 1 wt % Brij aqueous solution. Subsequently, the 0.25 wt % Brij aqueous solution (pH 6 to 7) was gently injected into the electrophoresis tank 10 of the separation apparatus 1A through the first injection port 40 so that the 0.25 wt % Brij aqueous solution was laminated above the 1 wt % Brij layer.

As described above, a pH gradient was formed to increase from the bottom to the top in the direction of gravitational force in the liquids in the electrophoresis tank 10.

(3) Separation Operation

A DC voltage (30 V) was applied between a lower electrode 30 (a positive electrode) and an upper electrode 20 (a negative electrode) of the separation apparatus 1A.

After the voltage application was completed, in a state in which the pH gradient of the liquids was formed in the electrophoresis tank 10, the 0.25 wt % Brij aqueous solution (pH 6 to 7) was injected through the first injection port 40, the 1 wt % Brij aqueous solution (pH 4 to 4.5) was injected through the second injection port 50, and the dispersion liquid in which the single-walled carbon nanotube mixture was dispersed in the dispersion medium was injected through the third injection port 40A.

Figure 5:
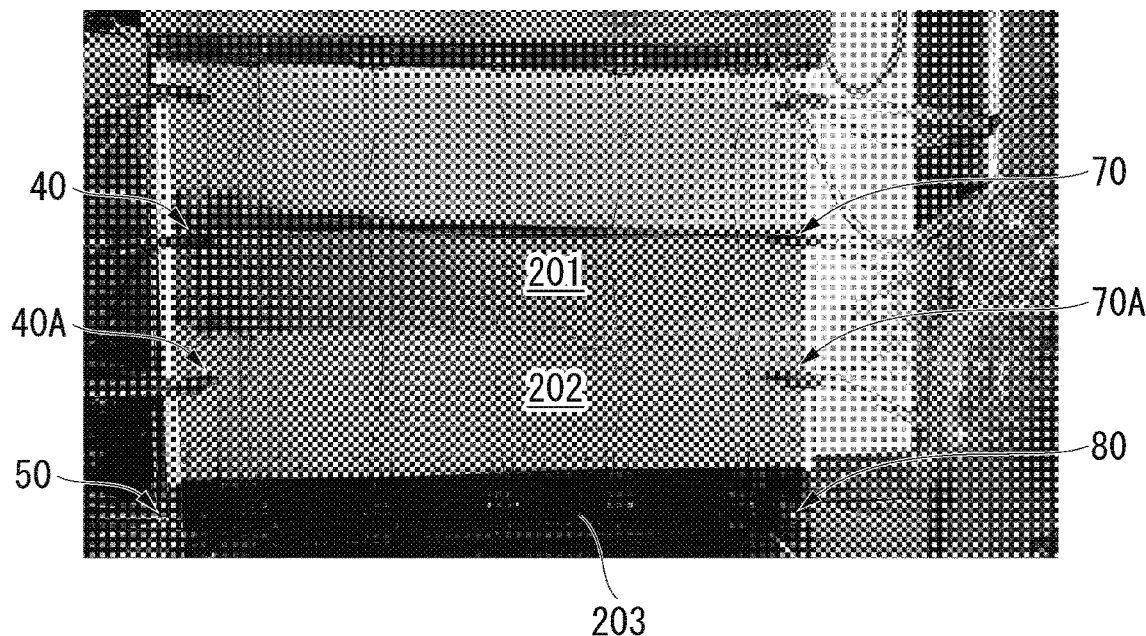
FIG. 5 is a photograph showing a state of sample movement during electrophoresis according to the embodiment.
Figure 6:
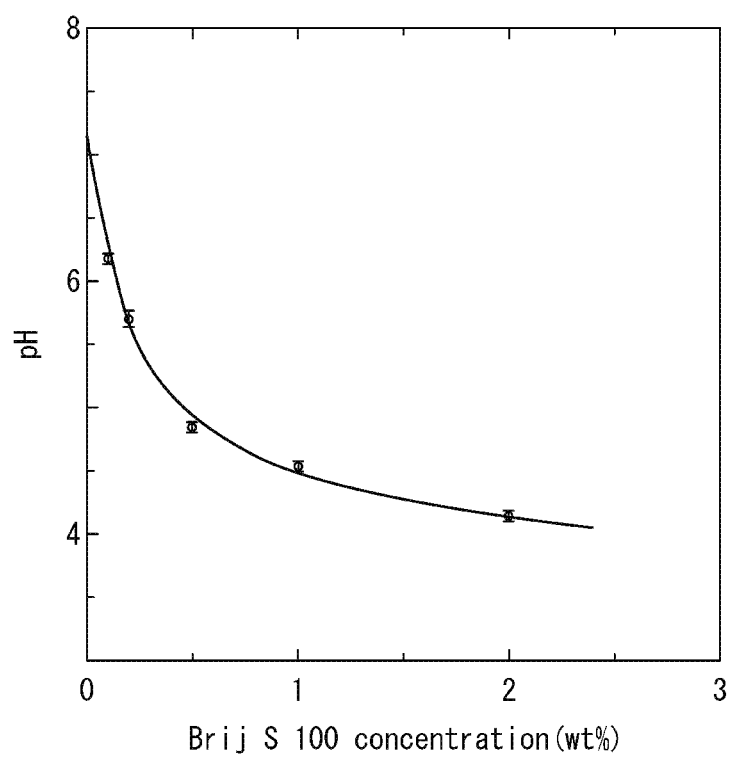
FIG. 6 is a graph showing a relationship between the concentration of a surfactant in a solution and a pH.

FIG. 5 shows a photograph of the electrophoresis tank 10 during a separation operation. A dispersion liquid in which a single-walled carbon nanotube mixture injected through the third injection port 40A was dispersed in a dispersion medium moved to a first recovery port 70 and a second recovery port 80 with the passage of time and three layers, i.e., a region (201) containing a large amount of metallic single-walled carbon nanotubes, a transparent region (202), and a region (203) containing a large amount of semiconducting single-walled carbon nanotubes were formed. Furthermore, the separated liquids were recovered through the first recovery port 70, the second recovery port 80, and the third recovery port 70A.

In the present invention, the dispersion liquid in which the single-walled carbon nanotube mixture was dispersed in the dispersion medium was injected through the third injection port 40A in a state in which the liquids having different pHs were injected through the first injection port 40 and the second injection port 50 in a state in which the liquid layers having different pHs were formed in the electrophoresis tank 10 so that the liquids had a pH gradient from a lowest pH to a highest pH directed upward from the bottom of the electrophoresis tank 10 and the separated liquids were recovered through the first recovery port 70, the second recovery port 80, and the third recovery port 70A. Thus, according to the present invention, it was confirmed that semiconducting single-walled carbon nanotubes and metallic carbon nanotubes could be separated and recovered continuously.

REFERENCE SYMBOLS

1, 1A Separation apparatus
10 Electrophoresis tank
20, 30 Electrode
40 First injection port
40A Third injection port
50 Second injection port
70 First recovery port
70A Third recovery port
80 Second recovery port

What is claimed is:

1. A single-walled carbon nanotube separation method comprising:
    forming a pH gradient such that pHs increase from a bottom to a top in a vertical direction in an electrophoresis tank;
    applying a direct current to a first electrode disposed in an upper part of the electrophoresis tank and a second electrode disposed in a lower part of the electrophoresis tank, the first and second electrodes being separated from each other in the vertical direction;
    in a state in which the pH gradient is formed, injecting a first liquid having a first pH into the electrophoresis tank through a first injection port provided in one side surface of the electrophoresis tank;
    in the state in which the pH gradient is formed, injecting a second liquid having a second pH lower than the first pH through a second injection port provided below the first injection port of the one side surface into the electrophoresis tank; and
    recovering a third liquid through a first recovery port provided at a position in which the first recovery port faces the first injection port and a fourth liquid through a second recovery port provided at a position in which the second recovery port faces the second injection port, the first recovery port being separated from the first injection port in a horizontal direction, the first and second electrodes being provided between the first injection port and the first recovery port when seen from the vertical direction, the second recovery port being separated from the second injection port in the horizontal direction,
    wherein at least one of the first and second liquids is a first dispersion having first single-walled carbon nanotubes dispersed therein, and
    wherein the first dispersion is separable into a dispersion in which single-walled carbon nanotubes mainly containing metallic single-walled carbon nanotubes are dispersed and a dispersion in which single-walled carbon nanotubes mainly containing semiconducting single-walled carbon nanotubes are dispersed.

2. The single-walled carbon nanotube separation method according to claim 1, wherein
    the first electrode is a negative electrode,
    the second electrode is a positive electrode,
    the third liquid is the dispersion in which the single-walled carbon nanotubes mainly containing metallic single-walled carbon nanotubes are dispersed, and
    the fourth liquid is the dispersion in which the single-walled carbon nanotubes mainly containing semiconducting single-walled carbon nanotubes are dispersed.

3. The single-walled carbon nanotube separation method according to claim 1, wherein a rate at which the first liquid is injected through the first injection port, a rate at which the second liquid is injected through the second injection port, a rate at which the third liquid is discharged through the first recovery port, and a rate at which the fourth liquid is discharged through the second recovery port are the same.

4. The single-walled carbon nanotube separation method according to claim 1, wherein, before injecting the first and second liquids into the electrophoresis tank, the pH gradient is formed by injecting a fifth liquid into the electrophoresis tank.

5. The single-walled carbon nanotube separation method according to claim 1, wherein the second liquid is the first dispersion.

6. The single-walled carbon nanotube separation method according to claim 1, wherein the first dispersion contains an additive other than the first single-walled carbon nanotubes.

7. The single-walled carbon nanotube separation method according to claim 6, wherein the additive is a non-ionic surfactant.

8. The single-walled carbon nanotube separation method according to claim 1, wherein the first dispersion contains heavy water and light water.

9. The single-walled carbon nanotube separation method according to claim 4, wherein the fifth liquid is a second dispersion having second single-walled carbon nanotubes dispersed therein.

10. The single-walled carbon nanotube separation method according to claim 1, wherein injecting the first liquid through the first injection port and injecting the second liquid through the second injection port are performed simultaneously.

11. A single-walled carbon nanotube separation method comprising:
- forming a pH gradient such that pHs increase from a bottom to a top in a vertical direction in an electrophoresis tank;
- applying a direct current to a first electrode disposed in an upper part of the electrophoresis tank and a second electrode disposed in a lower part of the electrophoresis tank, the first and second electrodes being separated from each other in the vertical direction;
- in a state in which the pH gradient is formed, injecting a first liquid having a first pH into the electrophoresis tank through a first injection port provided in one side surface of the electrophoresis tank;
- in the state in which the pH gradient is formed, injecting a second liquid having a second pH lower than the first pH through a second injection port provided below the first injection port of the one side surface into the electrophoresis tank;
- in the state in which the pH gradient is formed, injecting a third liquid through a third injection port provided between the first injection port and the second injection port of the one side surface into the electrophoresis tank; and
- recovering a fourth liquid through a first recovery port provided at a position in which the first recovery port faces the first injection port and a fifth liquid through a second recovery port provided at a position in which the second recovery port faces the second injection port, the first recovery port being separated from the first injection port in a horizontal direction, the first and second electrodes being provided between the first injection port and the first recovery port when seen from the vertical direction, the second recovery port being separated from the second injection port in the horizontal direction,
- wherein at least one of the first, second and third liquids is a first dispersion having first single-walled carbon nanotubes dispersed therein, and
- wherein the first dispersion is separable into a dispersion in which single-walled carbon nanotubes mainly containing metallic single-walled carbon nanotubes are dispersed and a dispersion in which single-walled carbon nanotubes mainly containing semiconducting single-walled carbon nanotubes are dispersed.

12. The single-walled carbon nanotube separation method according to claim 11, wherein injecting the first liquid through the first injection port, injecting the second liquid through the second injection port, and injecting the third liquid through the third injection port are performed simultaneously.

* * * * *